United States Patent [19]
Chesbro

[11] 3,967,381
[45] July 6, 1976

[54] GROUND SLOPE INDICATING INSTRUMENT

[76] Inventor: Edward N. Chesbro, Stowel Hill Road, Londonderry, Vt. 05148

[22] Filed: Jan. 3, 1975

[21] Appl. No.: 538,302

[52] U.S. Cl. .................................. 33/1 H; 33/88; 33/174 G
[51] Int. Cl.² .......................................... G01C 15/00
[58] Field of Search ........... 33/1 H, 1 G, 1 LE, 281, 33/282, 88, 174 G, 858 G, 353, 339, 343, 293, 295; 116/114 R

[56] References Cited
UNITED STATES PATENTS

| | | | |
|---|---|---|---|
| 1,909,267 | 5/1933 | Golt | 33/339 |
| 1,985,614 | 12/1934 | Merrigan | 33/100 |
| 2,327,982 | 8/1943 | Johnson | 33/282 |
| 2,665,482 | 1/1954 | Rupp | 33/1 LE |
| 2,753,633 | 7/1956 | Calver | 33/1 H |
| 2,762,128 | 9/1956 | Whelan | 33/353 |
| 2,923,065 | 2/1960 | Lombard | 33/174 G |
| 3,307,264 | 3/1967 | Wolfe | 33/293 |
| 3,348,312 | 10/1967 | Jones | 33/85 |

Primary Examiner—Richard E. Aegerter
Assistant Examiner—John W. Shepperd
Attorney, Agent, or Firm—Arthur K. Hooks

[57] ABSTRACT

A ground slope indicating instrument is described that comprises a pointed shaft that may be pushed point first into the ground, and at least one slope indicating rod being attached to the shaft. A spirit bubble level indicator is mounted at the top of the shaft to assist in placing the shaft in a verticle position. The rod or rods may be attached to the shaft by pressing them into holes provided in the shaft therefor. Alternatively rod receiving holes are provided in the periphery of a hub that is rotatably mounted in a verticle plane to the verticle shaft.

6 Claims, 4 Drawing Figures

U.S. Patent  July 6, 1976  3,967,381
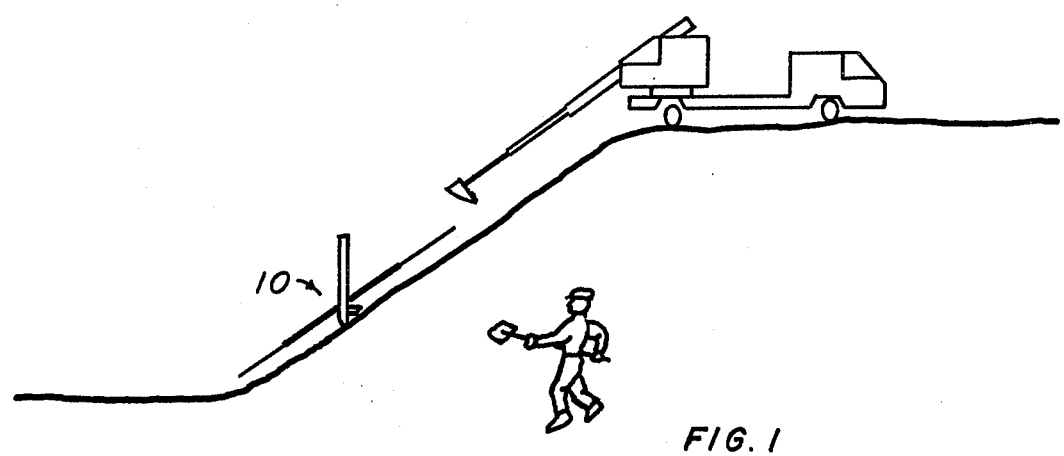
FIG. 1
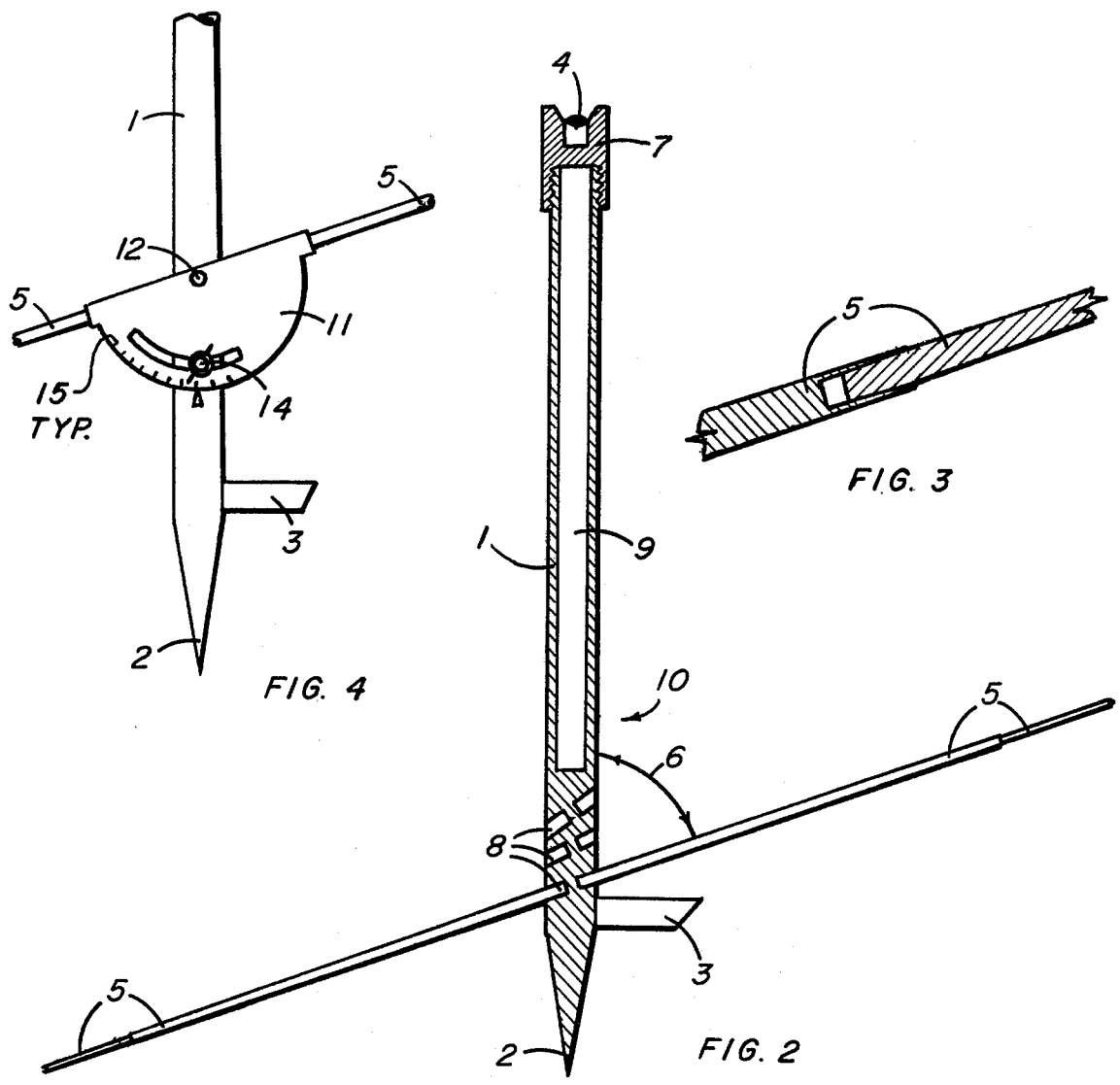
FIG. 4
FIG. 3
FIG. 2

GROUND SLOPE INDICATING INSTRUMENT

BACKGROUND OF THE INVENTION

This invention relates to an instrument for indicating a desired ground slope or grade, and more particularly to such a grade indicator that is visible at a distance to an earth moving machine operator.

The conventional practice is for a survey field party, using various instruments and measuring devices such as transit and tape, to stake out the line of a slope to be constructed. On the stakes are written numbers to indicate the amount of material to be removed or deposited. These stakes and the information written thereon, enable a skilled foreman to direct machine operators and laborers in the shaping of the slope. However, the workers normally have no visual indicator of the slope they are attempting to construct. It is often necessary for the survey party to check their progress. If the slope is found to be wrong, it may be very difficult and costly to correct.

Most slopes are constructed to one of several standard pitches or grades. The standard grade specified by the landscape architect will depend upon the stability of the material forming the slope, esthetics, drainage and other technical factors.

It is therefore an object of the present invention to provide a ground slope indicating instrument that visually indicates a desired ground slope to earth moving machine operators and other workers.

It is a further object of this invention to provide a simple grade indicating instrument that is readily portable, but is also easily assembled by unskilled workers in the field.

This and other objects will become apparent in the following description of the invention.

SUMMARY OF THE INVENTION

A ground slope indicating instrument for guiding machine operators and other workers in the construction of a sloped embankment includes a structural member being mountable on the ground. The preferred structural member consists of a shaft that is manually mounted vertically by pressing a tapered lower end of the shaft straight down into the ground. A bubble indication mounted on the shaft serves to indicate any deviation in the mounted position of the shaft from absolute vertical. One or more slope indicating rods are attached to the mounted shaft, the attached rods lying in the same straight line. The attachment of the rods to the shaft is achieved by inserting them into holes in the shaft provided therefor. Alternatively the rods are attached to a hub that is rotatably mounted to the shaft.

The indicating rods may be brightly colored and are long enough to be seen by workmen operating from hundreds of feet away to shape the slope. The slope indicating instrument of this invention obviates the now frequent need to wait for a foremen or survey party to tell the workmen whether they are achieving the desired grade.

BRIEF DESCRIPTION OF THE DRAWING

FIG. 1 is an illustration showing a slope indicating instrument of this invention mounted on an embankment that is being graded.

FIG. 2 shows a cross-sectional view of a first preferred embodiment of this invention.

FIG. 3 shows an enlarged detail of two end to end connected slope indicating rods.

FIG. 4 shows a detail of a second preferred embodiment of this invention.

DESCRIPTION OF THE PREFERRED EMBODIMENT

A first preferred embodiment of this invention is shown in FIG. 1, the main structural member being a steel shaft 1. In general, any rigid material will be suitable for making the shaft. For example, aluminum or fibre glass reinforced plastic materials are suitable. The upper end of the shaft 1, as shown, is threaded and has screwed thereon a cap piece 7 that houses a spirit bubble level indicator 4. The level indicator is so positioned that when the shaft is mounted vertically, the bubble is centered as visually determined with respect to a circular hairline mark centered thereon. The other end 2 of the shaft is tapered to facilitate pushing the rod into the ground at the site to be graded and mounting it thereto. A shaft projection 3 serves as a step against which pressure is conveniently applied for pushing the shaft into the ground. Any deviation of the shaft mounting position from the desired normal vertical position is detected by observing the bubble. The shaft may be subsequently righted to center the bubble.

Holes 8 are provided in the shaft at different angles (e.g. 6) to the shaft, and being designed to receive an end of a rod 5, holding it firmly at the corresponding angle 6. Opposite each hole is another hole having a common centerline or axis therewith such that another and similar rod 5 that is fixed in the opposite hole shares the same centerline with the first rod. Thus two rods being mounted in opposite holes in the shaft, respectively, serve as an easily seen indication of a desired grade by machine operators working at a distance from the ground slope indicating instrument 10, as illustrated in FIG. 1. The various angles of the pairs of coaxial holes 8 correspond to standard grades as are commonly called for by landscape architects.

The rods 5 as shown in FIG. 2 are of the telescoping type, similar to telescoping auto radio antennas. In Fig. 3 there is shown a joining means for fastening two rods 5 end to end. In both examples the rods are rendered extendable to make the indication of grade more discernable to workers at a distance and at the same time to permit easy storage and transportability of the rods.

The shaft 1 contains a chamber 9, access to which is had by unscrewing cap 7, providing a convenient storage place for the disassembled rods.

A second preferred embodiment differs from the first embodiment described above by having a different means for attaching the rods 5 to the shaft 1, as illustrated in FIG. 4. A hub 11 is rotatably fastened to the shaft 1, a hole in the hub being fitted over a headed pin 12 that projects from the shaft at right angles. Coaxial and opposite holes in the hub 11 are designed to receive and firmly hold two rods 5 in a mutually coaxial position. The angle of the coaxis of the two attached rods 5 is thereby variable with respect to the shaft. The hub 11 shown in FIG. 4 has a circular portion, at the periphery of which are provided visible marks 15 for indicating the angular position of the hub, and thus the attached rods 5, relative to the shaft. A hub locking means is made by providing a circular slot in the hub through which a threaded pin 14 projects from the shaft, a wing nut being threaded on to the outer portion of pin for clamping the hub and preventing inadvertant rotational movement thereof. Of course, only one hole need be provided in the hub 11 for attachment of only one slope indicating rod 5. However, the two shown are preferred, providing better mechanical balance and better visibility.

Wherefore the instrument of the first preferred embodiment provided only discrete indicated angles of grade, the instrument of the second preferred embodiment permits a continuous adjustment of the indicated grade.

The rods 5 should be rigid enough so as to experience insignificant deflection under their own weight, and are preferably brightly colored so as to have outstanding visibility. Telescoping rods may be made of chrome plated steel while for end to end connectable rods, fibre glass is a suitable material.

What is claimed is:

1. A ground slope indicating instrument for guiding the construction of an embankment comprising:
   a shaft being tapered to a point at one end whereby stable mounting may be realized by pushing said point into the ground;
   a spirit bubble level indicator being mounted to said shaft for the purpose of guiding said mounting of said shaft to a predetermined vertical position; and
   a plurality of slope indicating rods, said shaft having a plurality of pairs of holes, each said hole adapted to receive and fixedly attach one end of one of said rods, said holes of each of said pairs being coaxial and positioned on opposite sides of said shaft, and said rods attached in said coaxial holes defining a single straight line, said coaxial rods defining an angle in a vertical plane relative to said vertically mounted shaft to indicate a desired grade to earth moving machine operators at a work area remote from said instrument.

2. The instrument of claim 1 wherein said shaft additionally comprises a step mounted at right angles to said shaft near said pointed end for the purpose of aiding said pushing of said point into the ground.

3. The instrument of claim 1 wherein said inclination deviation determining means is a spirit bubble level indicator.

4. The instrument of claim 1 wherein said rods are of the telescoping type.

5. The instrument of claim 1 wherein one of said rods is adapted to be fastened end to end to another of said rods, for the purpose of extending the span of said rods and thus enhancing the visibility of said indicated grade.

6. The instrument of claim 1 wherein another two of said holes having a mutually opposite and coaxial relationship form another angle between their coaxis and said vertical shaft, so that two rods attached therein will indicate another desired grade to a remote earth moving machine operator.

* * * * *